US005096517A

United States Patent [19]

Comert et al.

[11] Patent Number: 5,096,517

[45] Date of Patent: Mar. 17, 1992

[54] PROCESS OF SOUND INSULATION OF HOLLOW BODIES

[75] Inventors: Ahmet Comert, Chaineux; Dominique Petit, Blegny, both of Belgium

[73] Assignee: Norton Company, Worcester, Mass.

[21] Appl. No.: 513,649

[22] Filed: Apr. 24, 1990

[30] Foreign Application Priority Data

May 9, 1989 [FR] France ................................ 89 06043

[51] Int. Cl.[5] ............................................ B32B 31/14

[52] U.S. Cl. ....................................... 156/79; 156/293; 156/303.1

[58] Field of Search ................ 156/79, 78, 293, 303.1; 264/46.5; 181/288

[56] References Cited

U.S. PATENT DOCUMENTS

| | | | |
|---|---|---|---|
| 917,545 | 4/1909 | Collier | 156/78 |
| 4,390,333 | 6/1983 | Dubois | 156/78 |

FOREIGN PATENT DOCUMENTS

| | | | |
|---|---|---|---|
| 0249842 | 12/1987 | European Pat. Off. | 264/46.5 |
| 9202826 | 11/1984 | Japan | 264/46.6 |

*Primary Examiner*—Michael W. Ball
*Assistant Examiner*—Daniel J. Stemmer
*Attorney, Agent, or Firm*—Arthur A. Loiselle, Jr.

[57] ABSTRACT

Hollow bodies are sound insulated by placing partial dams inside of the hollow bodies and filling the bodies with a polymer composition. The partial dams facilitate more complete filling of the hollow bodies with the polymer composition which is fluid when injected into the bodies.

2 Claims, 1 Drawing Sheet

FIG. 1
FIG. 1a
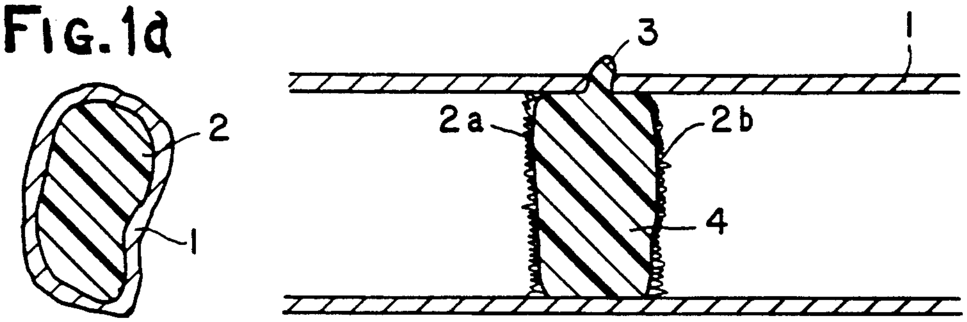
FIG. 2a
FIG. 2
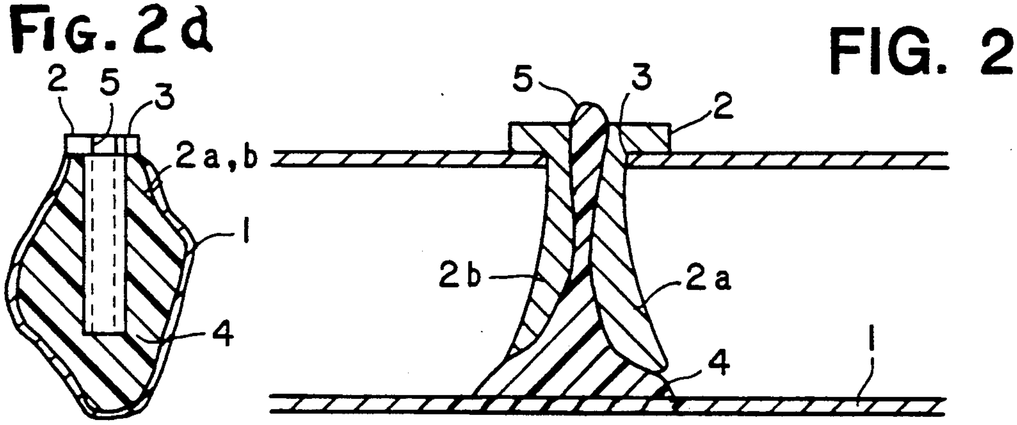
FIG. 3
FIG. 3a
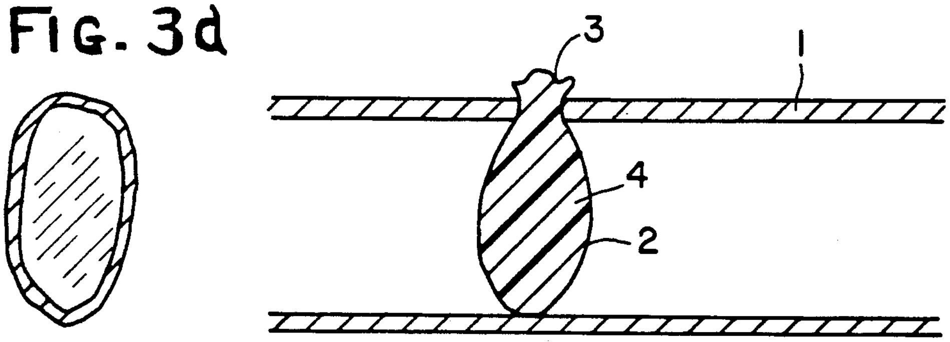
FIG. 4
FIG. 4a
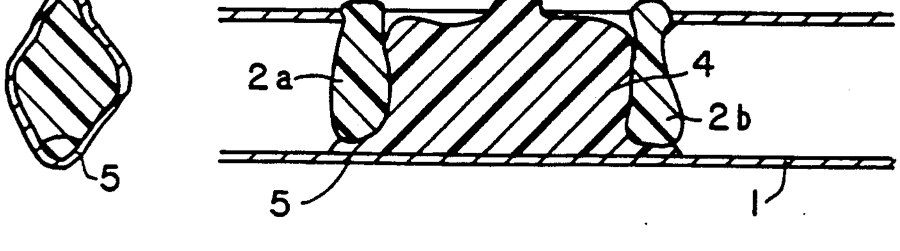

PROCESS OF SOUND INSULATION OF HOLLOW BODIES

The invention relates to a process of sound insulation of hollow bodies by injection of a polymer composition, and particularly of sound insulation of hollow shaped pieces which are used in the construction of an automobile, for example the lateral and vertical pieces for supporting the roof.

Such hollow shaped pieces generally consist of two shaped pieces connected together to form a tubular, elongated piece whose cross section can be of any shape suitable for the desired result.

These pieces, usually metallic, have rather high sound transmission properties, not only through the material of which they are made, but especially through the air which is found at the interior of the hollow shaped pieces.

Consequently, in the case of an automobile, for example, the vertical pieces for the roof, the side rails of chassis, or other constitutive pieces transmit the noises of the motor or of the suspension to the interior of the body.

In order to avoid this disadvantage, it has already been proposed to block the passage of air to the interior of the hollow shaped piece by means of a polymer composition (for example, a polyurethane foam which is injected through a hole in the shaped piece).

The result obtained is a proper attenuation of the sound transmitted by the air, which does not cross through the block formed in this way. In the case of an automobile, this adds to the comfort of the passengers.

Injection of these polymer compositions, however, poses problems.

If a composition is used which has a low viscosity during application, the injected product will flow in the shaped piece and one will use a greater quantity than that which is strictly required.

On the other hand, if one uses a composition with a relatively high viscosity during application, this composition will be injected in the shaped piece without totally sealing the shaped piece, because the product, which is too viscous to go into the places with reduced cross section, will "advance" in the shaped piece without occupying the spaces.

The invention proposes to palliate these disadvantages by suggesting a process of sound insulation of hollow bodies by means of a polymer composition which can ensure a proper sealing of the section of this body while limiting the quantity of product to be used.

This purpose is achieved according to the invention by the fact that two obstacles which are a small distance apart are positioned in the section of the hollow body to be sealed, by the fact that the opening for injection of the composition is cut between these two obstacles, and by the fact that the composition is injected through this opening, so that it occupies the whole section of the hollow body before passing the obstacles.

According to a particular embodiment of the invention, the obstacles consist of two partitions which are solidly connected in a nonsealed manner to the wall of the shaped piece. These partitions can be solid or can consist of a grating.

According to another embodiment form, the obstacles consist of a peg provided with an axial bore and slit from one end over a portion of its length; the slit end of this peg is driven into an opening of the shaped piece so that the slit is located in the plane of cross section of the shaped piece. The product is injected into the bore of the peg, so that it separates the two parts of the peg which are separated by the slit and flows through the peg into the plane of the cross section of the shaped piece until the whole section is sealed.

According to another embodiment form, the obstacles consist of a balloon introduced through an opening of the way as to seal the section of the shaped piece by inflating the balloon.

According to another embodiment form, the obstacles consist of two injections of polymer composition with a viscosity high enough that it does not flow before hardening into openings between which an intermediary opening for injection of the composition is located; the product injected through the latter hole occupies the spaces left free by the product which is injected through the two other openings and which has already solidified, in order to form a perfect seal. In this case, the composition injected through the intermediary hole can have a low viscosity.

BRIEF DESCRIPTION OF THE DRAWINGS

FIG. 1 is a hollow body showing an obstacle or barrier therein formed between two closely located partitions which are in the form of grates;

FIG. 1*a* is a section taken through the hollow body and the obstacle.

FIG. 2 is a hollow body with an obstacle or barrier located therein, where the barrier is formed between the two parts of a slit peg;

FIG. 2*a* is a section through the obstacle or barrier and the slit peg.

FIG. 3 is an obstacle or barrier in a hollow body formed by filling a balloon-like device inserted into the hollow body;

FIG. 3*a* is a section taken through the hollow body and the obstacle therein;

FIG. 4 is a hollow body containing a barrier or obstacle made by first forming two closely spaced apart partitions formed of a high viscosity polymer, the space there between being filled with a lower viscosity polymer.

In FIGS. 1 through 4 of the appended drawings, different embodiment of the process according to the invention have been represented.

FIG. 1 shows the production of the obstacles using partitions in the form of grating. The partitions in the form of grating (2) are positioned in shaped piece (1), on both sides of the opening for injection (3). Composition (4) is then injected and contained until complete stabilization.

According to another embodiment, shown in FIG. 2, peg (2) is used which is driven into opening (3). This peg is provided with axial bore (5) and is slit in two parts (2*a*) and (2*b*) which are separated from each other when the product is injected through bore (5). Product (4) flows through the slit separating the two parts, on both sides of the peg, in the plane of cross section of shaped piece (1) and perfectly seals this section According to another embodiment, shown in FIG. 3, the obstacles consist of wall (2) of a balloon which is introduced through opening (3). The injection of the composition into the balloon inflates it and seals the whole section of shaped piece (1).

According to another embodiment of the invention, shown in FIG. 4, first, a composition with a relatively high viscosity is injected through holes (3*a*) and (3*b*) of shaped piece (1) in order to form two obstacles (*2a*) and (*2b*) which, because of the viscosity, leave spaces (5). Then, through opening (3), located between the first two, mass (4) is then injected and fills the available space; then, under the effect of the injection pressure, it fills the spaces (5), thus completely sealing the section.

In the latter example, the degree of viscosity of the product injected through opening (3) is not very important, after the time it is able to seal spaces (5).

It goes without saying that the invention is not limited to the examples described, but that one can execute it in different ways without leaving the scope of the invention.

We claim:

1. A process of sound insulating hollow bodies by injecting a first polymer composition through at least one perforation of the hollow body which solidifies to seal a section of said hollow body, characterized in that in the hollow body (1) to be sealed, two obstacles (*2a*, *2b*) are positioned a small distance apart on both sides of said perforation (3) for injection of the first polymer composition (4), and in that the first polymer composition (4) is injected through this perforation so that it occupies the whole cross-section of the hollow body before passing the obstacles, and wherein the obstacles consist of two injections (*2a*, *2b*) of a second polymer composition with a sufficiently high viscosity so as not to flow before hardening, said injections (*2a*, *2b*) being injected through openings (*3a* and *3b*) positioned a small distance apart on both sides of said perforation.

2. A process of sound insulation according to claim 1, characterized in that the composition injected through said perforation can have a low viscosity.

* * * * *